(12) United States Patent
Radwan

(10) Patent No.: US 10,813,719 B1
(45) Date of Patent: Oct. 27, 2020

(54) METHOD AND EXTRACTION DEVICE FOR REMOVAL OF BROKEN ROOT CANAL FILE FRAGMENT

(71) Applicant: Sherif Radwan, New York, NY (US)

(72) Inventor: Sherif Radwan, New York, NY (US)

( * ) Notice: Subject to any disclaimer, the term of this patent is extended or adjusted under 35 U.S.C. 154(b) by 283 days.

(21) Appl. No.: 15/959,410

(22) Filed: Apr. 23, 2018

Related U.S. Application Data

(60) Provisional application No. 62/516,164, filed on Jun. 7, 2017.

(51) Int. Cl.
*A61C 5/46* (2017.01)
*A61C 1/07* (2006.01)

(52) U.S. Cl.
CPC . *A61C 5/46* (2017.02); *A61C 1/07* (2013.01)

(58) Field of Classification Search
CPC .................................. A61C 5/46; A61C 1/07
USPC ......................................................... 433/224
See application file for complete search history.

(56) References Cited

U.S. PATENT DOCUMENTS

| | | | | |
|---|---|---|---|---|
| 3,322,124 A | * | 5/1967 | Ireland | A61B 17/50 433/141 |
| 4,247,285 A | * | 1/1981 | Roig-Greene | A61C 5/46 433/141 |
| 4,337,038 A | * | 6/1982 | Saito | A61C 5/46 204/224 R |
| 4,746,292 A | | 5/1988 | Johnson | |
| 5,085,586 A | * | 2/1992 | Johnson | A61C 13/30 433/165 |
| 5,173,049 A | * | 12/1992 | Levy | A61B 18/26 433/215 |
| 5,839,896 A | * | 11/1998 | Hickok | A61C 3/16 433/159 |
| 5,879,160 A | | 3/1999 | Ruddle | |
| 5,951,287 A | * | 9/1999 | Hawkinson | A61C 8/005 433/141 |

(Continued)

FOREIGN PATENT DOCUMENTS

| CN | 104688361 | 6/2015 |
|---|---|---|
| CN | 204863515 | 12/2015 |

(Continued)

OTHER PUBLICATIONS

Salvin Dental Specialties, Inc., 3450 Latrobe Dr., Charlotte, N.C. 28211, 2016 Catalog, p. 30 and p. 39.

*Primary Examiner* — Matthew M Nelson
(74) *Attorney, Agent, or Firm* — Thomas A. O'Rourke; Bodner + O'Rourke, LLP

(57) ABSTRACT

A device for removing a file fragment lodged within a root canal of a tooth may include: a flexible shaft configured for insertion into the root canal; a plurality of prongs extending from the distal end of the flexible shaft; a concentric shaft slidable upon the flexible shaft and configured to contact and move the prongs into contact with the file fragment; and a device to create and deliver vibrations at an intensity configured to cause local melting of the plurality of prongs in contact with the fragment, for welding of each of the prongs to the fragment. Counter-rotation of the shaft and fragment may cause it to be dislodged from the canal. Prior to using the device, the root canal may generally be enlarged using a drill, and an umbrella drill is used to form an opening around the coronal end of the fragment to expose a portion thereof.

12 Claims, 11 Drawing Sheets

(56) References Cited

U.S. PATENT DOCUMENTS

| | | | |
|---|---|---|---|
| 6,227,855 | B1 | 5/2001 | Hickok |
| 6,280,197 | B1 | 8/2001 | Benado |
| 6,976,844 | B2 | 12/2005 | Hickok |
| 7,080,981 | B2 | 7/2006 | Terauchi |
| 7,367,804 | B2 | 5/2008 | Lewis |
| 7,677,892 | B2 * | 3/2010 | Aleksandrovskiy ..... A61C 5/46 433/224 |
| 2004/0142302 | A1 | 7/2004 | Aeby |
| 2007/0065773 | A1 | 3/2007 | Hickok |
| 2009/0176189 | A1 | 7/2009 | Hof |
| 2010/0055641 | A1 * | 3/2010 | Terauchi .................. A61C 5/46 433/75 |
| 2011/0177468 | A1 | 7/2011 | Barbosa Ormiga Galva |
| 2013/0101957 | A1 | 4/2013 | Lee |
| 2016/0317249 | A1 | 11/2016 | Gao |

FOREIGN PATENT DOCUMENTS

| | | |
|---|---|---|
| DE | 29813166 | 11/1998 |
| ES | 2201887 | 3/2004 |
| FR | 1213369 | 3/1960 |
| JP | 2004024621 | 1/2004 |
| KR | 101007905 | 6/2010 |
| RU | 2643411 | 10/2017 |
| WO | WO2010037194 | 4/2010 |

\* cited by examiner

METHOD AND EXTRACTION DEVICE FOR REMOVAL OF BROKEN ROOT CANAL FILE FRAGMENT

CROSS REFERENCES TO RELATED APPLICATIONS

This application claims priority on U.S. Provisional Application Ser. No. 62/516,164 filed on Jun. 7, 2017, the disclosures of which are incorporated herein by reference.

FIELD OF THE INVENTION

The present invention relates to dentistry, and more particularly to apparatus and methods for extraction of the fragments of metal tools, which may be broken and may get stuck in the root canal of the tooth during, for example, endodontic treatment.

BACKGROUND OF THE INVENTION

The human tooth is composed of hard enamel overlaid on top of softer dentin, within which is formed the root canal. The root canal consists of the pulp chamber in the coronal portion of the tooth, the main canals, and other smaller branches referred to as accessory canals. The pulp chamber houses soft, living tissue including dental pulp, blood vessels, and nerves. The total number of main canals for each tooth depends on the number of the tooth roots, and generally ranges from one to four. Occasional a tooth may have more than one main canal per root.

A "root canal" procedure (i.e., endodontic treatment) is performed when the pulp becomes inflamed or infected, which may result from a crack or chip in the tooth, or a faulty crown, or repeated dental procedures performed on the tooth, periodontal disease, or deep decay. The root canal procedure involves multiple steps including: placement of a rubber dam (a thin sheet of latex) over the tooth, which will prevent contamination of the canal; forming an access cavity using a dental drill; measuring the length of each canal using x-rays and/or using electronic measurements; cleaning and shaping each canal using the proper length file, based on the canal measurements, so that all of the necrotic tissue is removed, and so that the canals are enlarged and flared; injecting irrigating solutions, typically sodium hypochlorite, into the canal(s) to facilitate disinfection and to remove debris and contaminants; packing the cleaned canal with a rubber material (e.g., gutta percha) that may be pre-formed into a cone that may match the shape (i.e. the diameter and taper) of the root canal file that was used, or which rubber may be injected using a "gun"; placing a temporary filling; and finally placing a permanent dental restoration.

Such endodontic treatment is usually successfully. In rare instances, an unusual root canal shape that may exhibit complex branching, including horizontal branches, may go unnoticed by the dentist, and will therefore remain infected, causing failure of the treatment.

Other failures of the endodontic treatment may result from a failure of the file used. The endodontic files used for cleaning and shaping (i.e., enlarging), in conjunction with the irrigation, are intended to perform complete chemo/mechanical debridement of the root canal to the length of the apical foramen. These files are typically made of stainless steel or nickel titanium, and usually have 2% tapers, but files with up to a 12% taper are increasingly being used. The files are operated with a vibratory in-and-out motion, and may provide continuous irrigation using a disinfectant through a lumen in the hollow file, which liquid disinfectant is delivered by a peristaltic pump. The goal is removal of a small uniform layer of dentin from the entire circumference of the root canal, and preservation of as much dentin as possible, while forming clean canals.

However, these files are subject to cyclic fatigue, and failure, occasionally resulting in a fragment being wedged and retained in the deepest portion of the root canal of a patient. A broken file retained in the canal may adversely affect the success of the endodontic treatment.

If the canal shaping and debris removal procedure was nearly completed, and adequate irrigation had been performed, the mere retention of the file fragment in the canal at that stage is not per se harmful, and such patients may remain asymptomatic and even unknowing of its existence therein. At the other extreme, if the tooth being treated was badly infected and the failure occurred early in the procedure, failure of the endodontic treatment is very likely. Lower overall success rates for root canal procedures are associated with endodontic file failure and unremoved fragments. Therefore, removal of the file fragment is undoubtedly advantageous for the patient.

Devices/methods that may be related, and which are not admitted herein to be prior art to the present invention, may be shown by the following.

U.S. Pat. No. 3,322,124 to Ireland is for a method and apparatus for retrieving metallic objects from teeth, flesh, bone, and the like.

U.S. Pat. No. 4,247,285 to Roig-Greene discloses removal of an endodontic instrument fragment from a root canal using an elongated tube, a wire, and a clamping means such as a mosquito hemostat.

U.S. Pat. No. 4,337,038 to Saito is for an electrolytic implement and method for removing metal pieces left in root canals of teeth.

U.S. Pat. No. 4,746,292 to Johnson is for a tool and method for removing a parted endodontic file.

U.S. Pat. No. 5,173,049 to Levy is for removing a post embedded in a tooth.

U.S. Pat. No. 5,879,160 to Ruddle is for a root canal obstruction removal system.

U.S. Pat. No. 5,951,287 to Hawkinson is for dental implant failed fastener recovery systems, devices, and methods.

U.S. Pat. No. 6,976,844 to Hickok discloses use of a microtube instrument to bore around and capture the broken file similar to the Ruddle device.

U.S. Pat. No. 6,227,855 to Hickok is for an instrument removal system.

U.S. Patent Application Pub. No. 2004/0142302 by Aeby is for a dental instrument for the extraction of an object from a root canal.

U.S. Pat. No. 6,976,844 to Hickok is for ultrasonic microtube dental instruments and methods of using same.

U.S. Pat. No. 7,080,981 to Terauchi is for a device for removing a broken instrument . . . from the root canal.

U.S. Patent No. 2007/0065773 to Hickok is for a root canal obstruction removal system.

U.S. Pat. No. 7,367,804 to Lewis is for an endodontic instrument extractor tool manufactured from shape memory material.

U.S. Patent Application Pub. No. 2009/0176189 to Hof is for a method and system for extraction of broken objects from enclosed spaces.

U.S. Patent No. 2010/0055641 by Terauchi is for a dental instrument for eliminating broken pieces using a flexible guide plate.

U.S. Pat. No. 7,677,892 to Aleksandrovskiy is for a method and extractor for removing a tool fragment from a tooth root canal.

U.S. Pat. No. 7,677,892 to Aleksandrovskiy discloses that two metal insulated electrodes, which are assembled as a cylinder, are introduced into the root canal until they touch the broken file fragment. Sufficient current is then supplied for welding of the electrodes to the fragment. The electrodes are then used for extraction of the fragment.

U.S. Patent Application Pub. No. 2011/0177468 by Barbosa Ormiga Galvao is for a method and device for removing metallic fragments and metallic elements from dental root canals.

U.S. patent Application No. 2016/0317249 by Gao is for an assembled device for retrieving a broken instrument from a root canal.

OBJECTS OF THE INVENTION

It is an object of the invention to provide an improved tool for use in removing a broken endodontic file stuck in a root canal of a patient's tooth.

It is another object of the invention to provide a tool for removal of a broken endodontic file stuck in a root canal of a patient's tooth, which tool does not impose asymmetric loading of the file fragment during application of a force to cause its extraction.

It is a further object of the invention to provide a tool, for use in the removal of a broken endodontic file stuck in a root canal of a patient's tooth, which does not require application of direct heat to the tool.

It is another object of the invention to provide a tool for removal of a broken endodontic file stuck in a root canal of a patient's tooth, which tool engages an outer circumference of the end of the broken file segment.

It is also an object of the invention to provide a tool for removal of a broken endodontic file stuck in a root canal of a patient's tooth, which tool provides a torque for rotating the file fragment during application of an axial force for its extraction from the root canal.

It is another object of the invention to provide a tool for removal of a broken endodontic file stuck in a root canal of a patient's tooth, which tool provides vibrations to better overcome static friction when attempting to rotate the file fragment during application of an axial force for extracting it from the root canal.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the present invention, a device for removing a file fragment lodged within a root canal of a tooth may include: a flexible shaft having a proximal end and a distal end, with at least its distal end being configured to be inserted into the root canal of the tooth; a plurality of prongs configured to extend from the distal end of the flexible shaft; a concentric shaft configured to slide upon the flexible shaft and contact the plurality of prongs; and a device to create and deliver vibrations at an intensity configured to cause local melting of the plurality of prongs in contact with the file fragment, and welding of each of the prongs to the file fragment.

An interior surface of each of the plurality of prongs may be formed with curvature configured to match a curvature of a proximal (exposed) portion of the file fragment. The interior surface of each of the plurality of prongs may also be spaced apart from an axis of the distal end of the shaft, to be spaced apart from the file fragment when moved over the exposed portion of the fragment (see e.g., gap G in FIG. 7C). Each of the plurality of prongs may also be formed at an angle to an axis of the flexible shaft at the distal end. The plurality of prongs may also be equally spaced about the axis of the flexible shall at the distal end. For example, where two prongs are used, they may be positioned 180 degrees apart, where three prongs are used, they may be positioned 120 degrees apart, where four prongs are used, they may be positioned 90 degrees apart, etc.

The process of using the apparatus for extracting a metal file fragment wedged in a root canal of a tooth may begin by enlarging the root canal in which the metal fragment is wedged using a drill, and then forming an opening in the canal around the coronal end of the wedged metal fragment using an umbrella drill to expose a portion of the proximal end of the fragment. The flexible shaft of the device may then be inserted into the root canal so that the prongs surround the exposed end of the metal fragment. The concentric shaft may then be slid toward the prongs to cause them to deform so that a substantial portion of each of the prongs is in contact with the metal fragment. Ultrasonic vibrations may be delivered to the prongs with an intensity being sufficient for generating heat locally for melting and welding of the prongs to the metal fragment. The welded prongs may be allowed to cool, and then a torque may be applied to the flexible shaft to cause rotating of the wedged metal fragment to cause dislodgment of the fragment. The shaft may then be withdrawn to cause extracting of the metal fragment from the root canal. The cooling of the welded prongs may be augmented by flowing an irrigant through a lumen in the shaft. The rotation to cause dislodgement of the fragment may be more easily facilitated by applying ultrasonic vibrations to the prongs, after the cooling, which vibrations may be insufficient to cause local melting of the prongs, but which are sufficient for overcoming static friction during the application of a torque, for easier rotating of the tool and the wedged metal fragment within the canal (i.e., for causing a reduction in static friction). The applied torque to cause the rotating of the tool may be reversed from the rotating of the file when it is ordinarily used for cleaning and shaping of the canal prior to being broken.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference.

Furthermore, the described features, advantages, and characteristics of any particular embodiment disclosed herein, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variation resulting from a stack up (i.e., the sum) of multiple individual tolerances.

It is further noted that any use herein of relative terms such as "top," "bottom," "upper." "lower." "vertical," and "horizontal" are merely intended to be descriptive for the reader, based on the depiction of those features within the figures for one particular position of the device, and such terms are not intended to limit the orientation with which the device of the present invention may be utilized.

Figure 1:
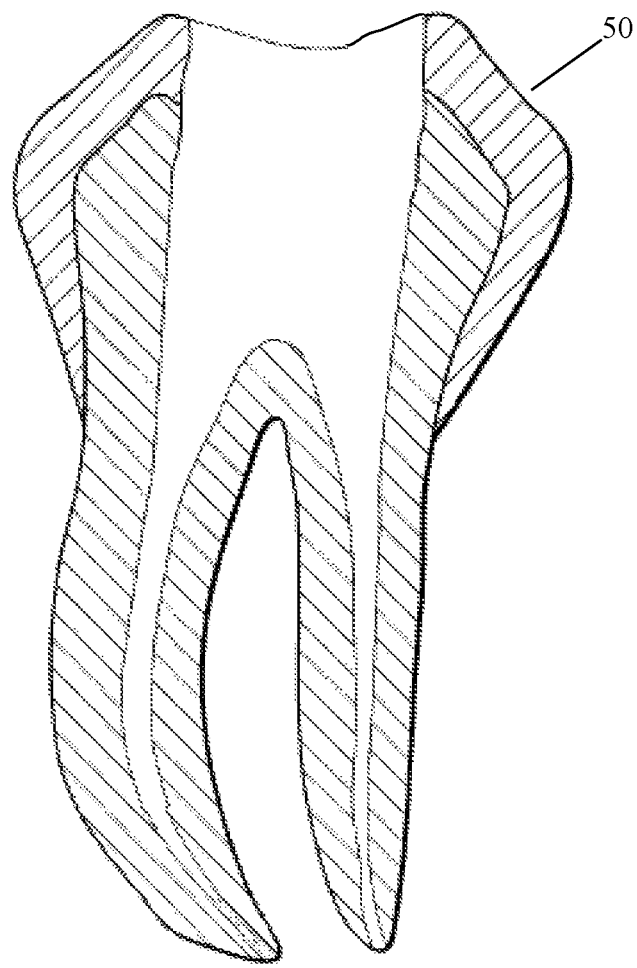
FIG. 1 illustrates a tooth in which an access cavity has been formed using a dental drill to expose the root canals.
Figure 2:
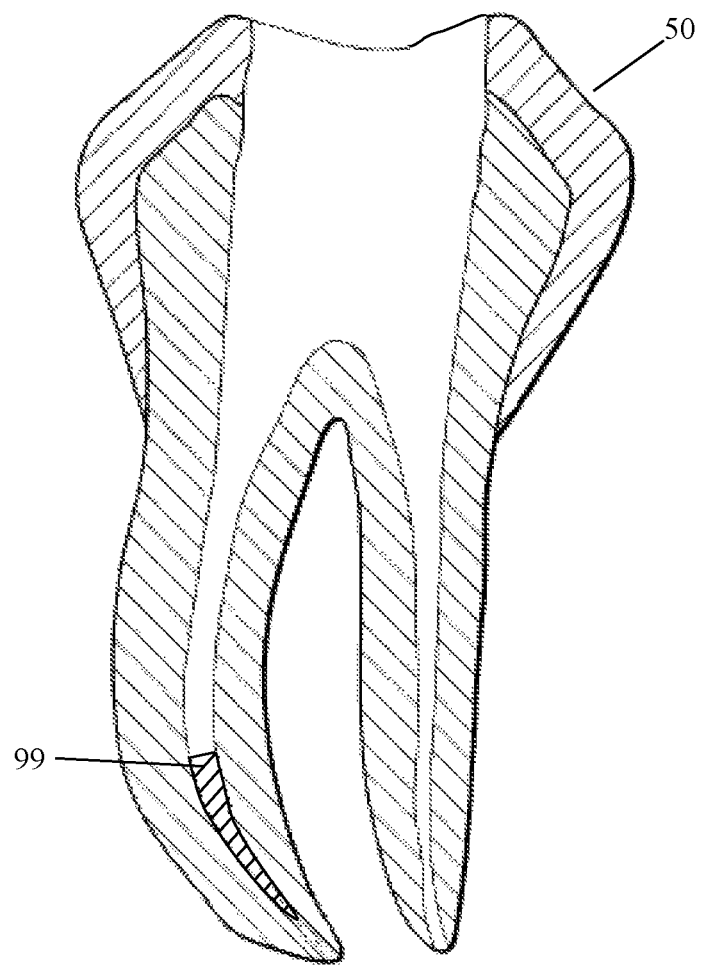
FIG. 2 illustrates a tooth in which a file has broken during the root canal procedure, leaving behind a fragment deep in one of the root canals of the tooth of FIG. 1.

FIG. 1 illustrates a tooth 50 in which an access cavity has been formed using a dental drill to expose the main root canals, which are to undergo endodontic treatment. FIG. 2 illustrates the tooth of FIG. 1, in which a root canal file has broken during the procedure, leaving behind a file fragment 99 wedged deep in one of the main canals of the tooth.

Figure 3:
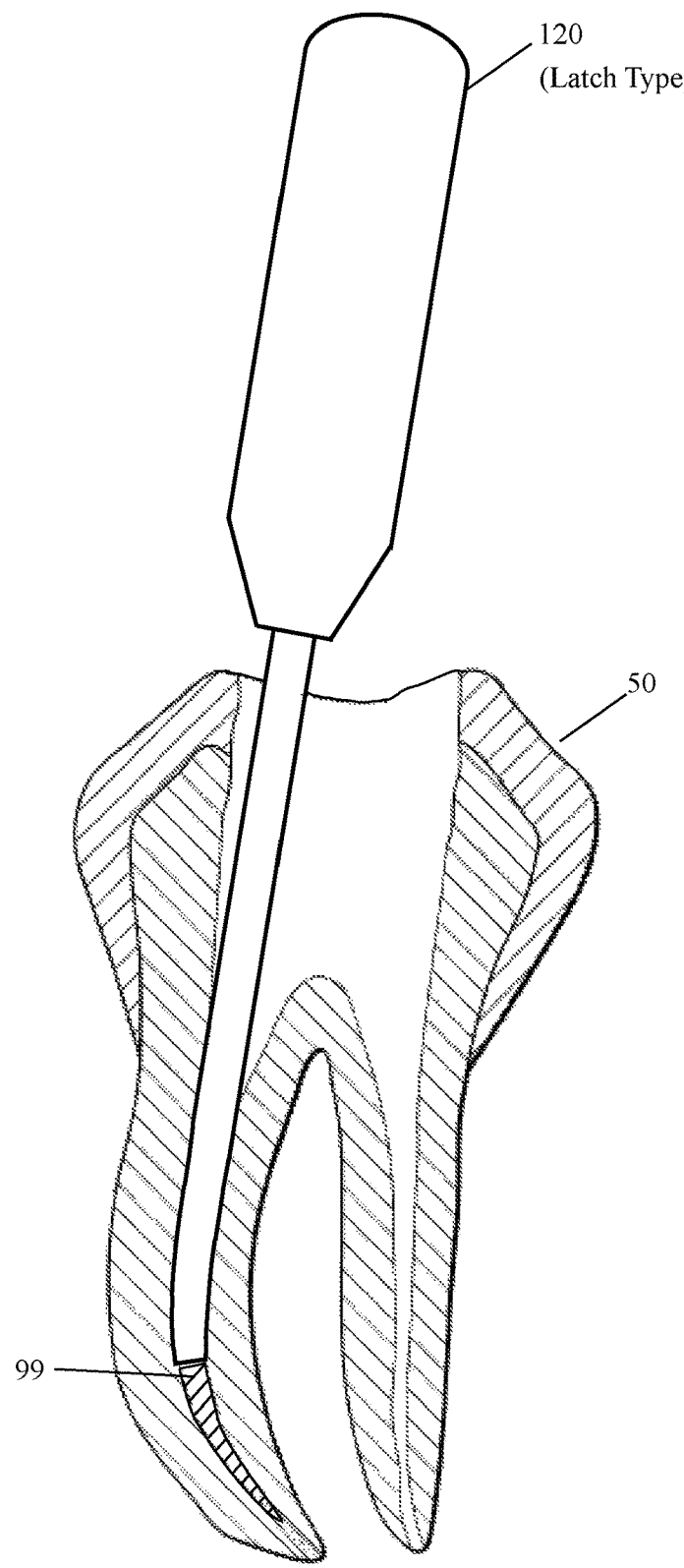
FIG. 3 illustrates a pilot hole drill being used to open up the root canal in which the broken file fragment is wedged.
Figure 4:
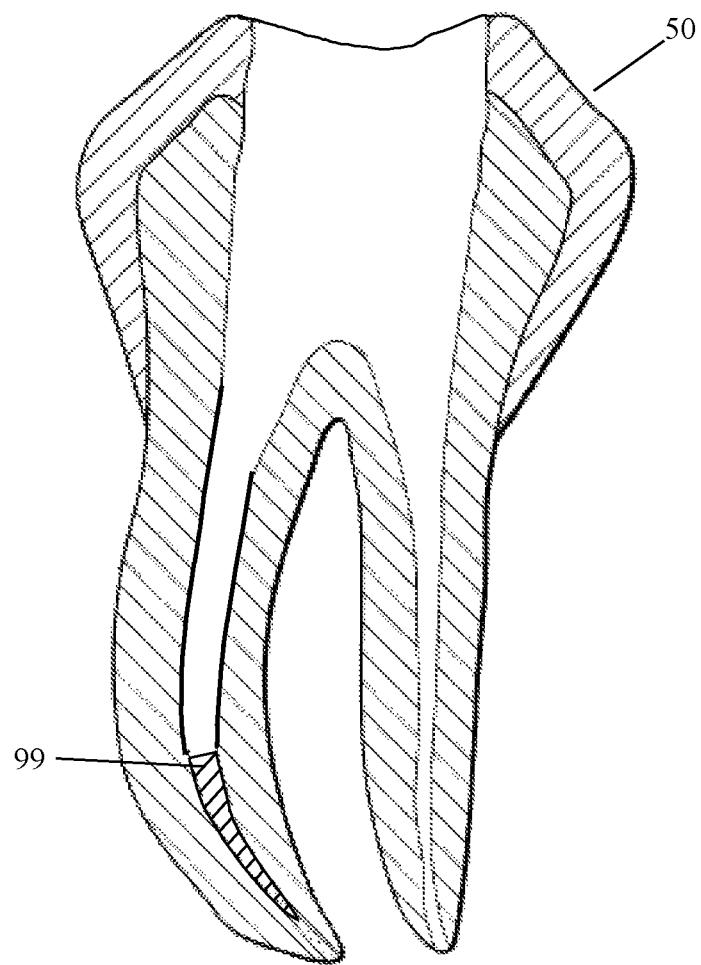
FIG. 4 illustrates the enlarged root canal opening after removal of the pilot hole drill shown in FIG. 3.
Figure 5:
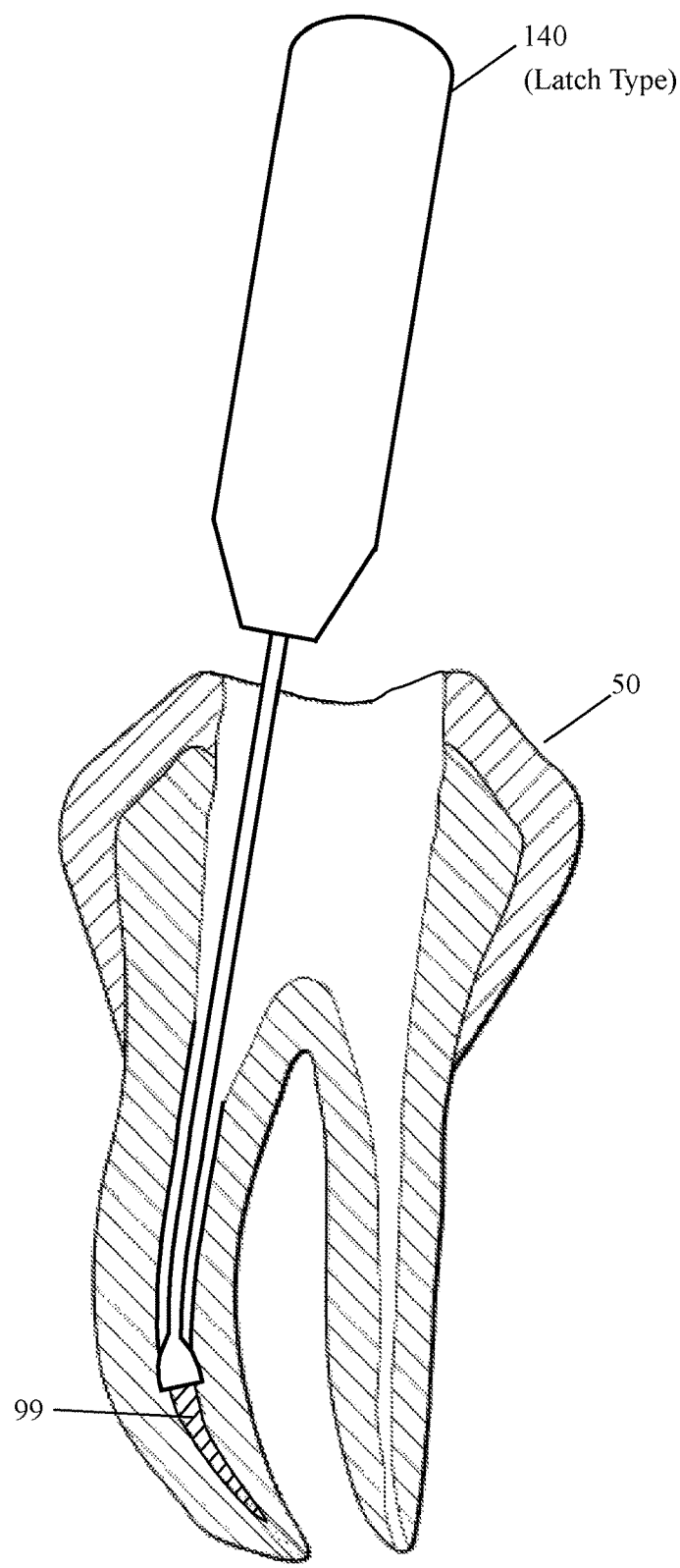
FIG. 5 illustrates use of an umbrella drill in the enlarged root canal to form an opening in the canal around the coronal end of the file fragment.

In a first embodiment of the present invention for removing a root canal file fragment, as shown in FIG. 3, a pilot hole drill 120 may be used for enlarging the root canal in which the file fragment 99 is wedged. In one embodiment the drill may be one millimeter in diameter, and in other embodiments, another size may be used as required. FIG. 4 illustrates the enlarged root canal opening after removal of the pilot hole drill 120 shown in FIG. 3. Next, as shown in FIG. 5, an umbrella drill 140 is inserted into the root canal, and is used to form an opening in the canal around the coronal end of the file fragment 99. In one embodiment the umbrella drill diameter ($) may be 1.0 millimeter, and in other embodiments, another size (e.g., 1.2 mm) may be used as required. In other embodiments, other methods of forming an opening about the end of the file fragment may alternatively be used.

Figure 6:
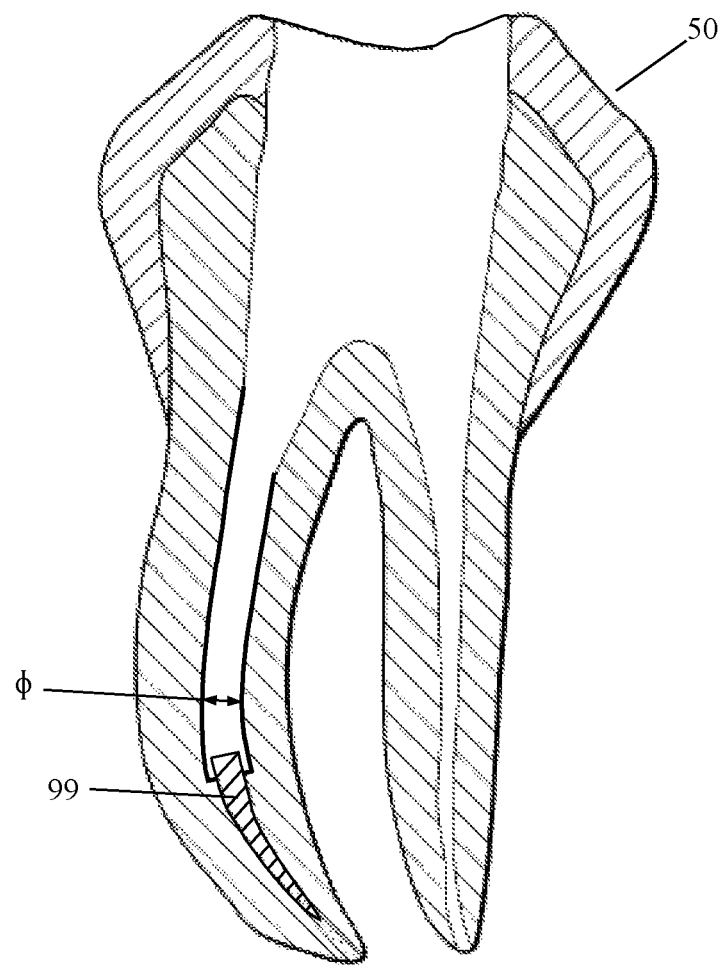
FIG. 6 shows the opening formed around the coronal end of the file fragment after the umbrella drill of FIG. 5 has been removed.
Figure 7:
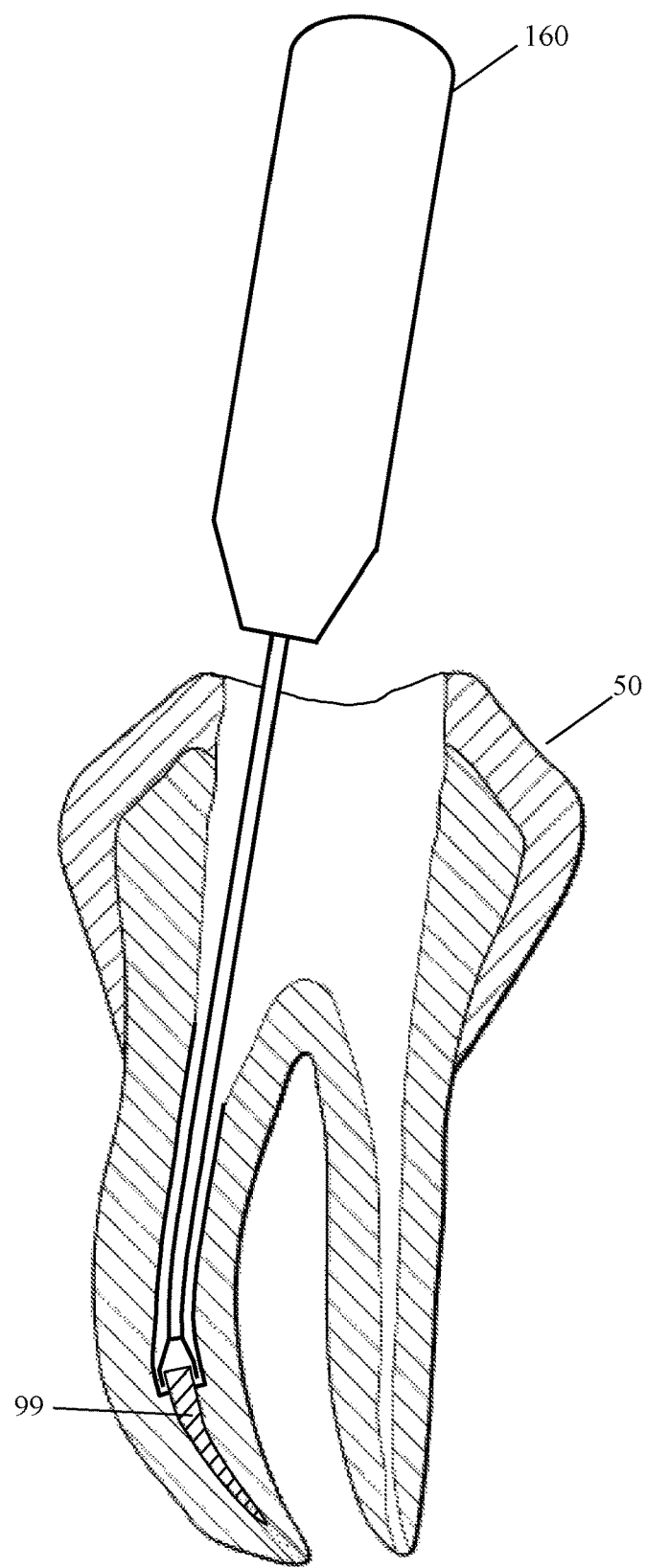
FIG. 7 illustrates insertion of a tool for welding of a multi-pronged tip to the file fragment in the root canal, using electric current.
Figure 7B:
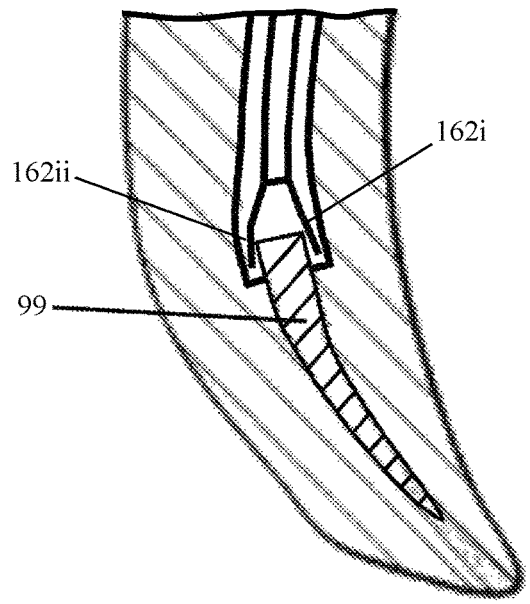
FIG. 7B is the enlarged detail view of FIG. 7A, but is shown with angled prongs.
Figure 7A:
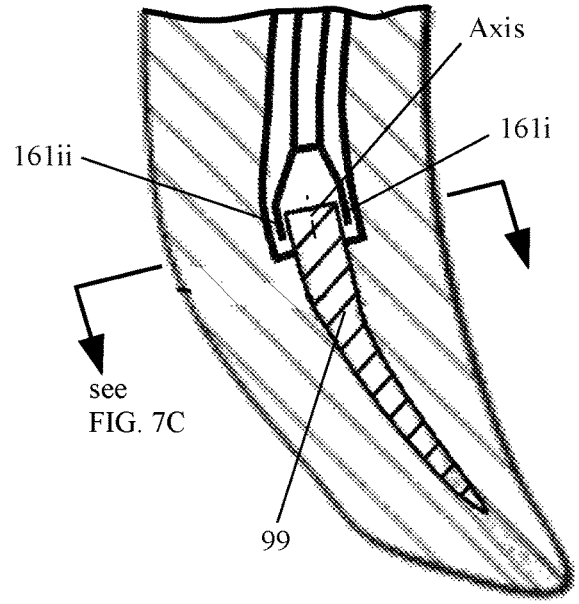
FIG. 7A is an enlarged detail view of the multi-pronged tip and the file fragment in the root canal, as shown in FIG. 7.
Figure 7C:
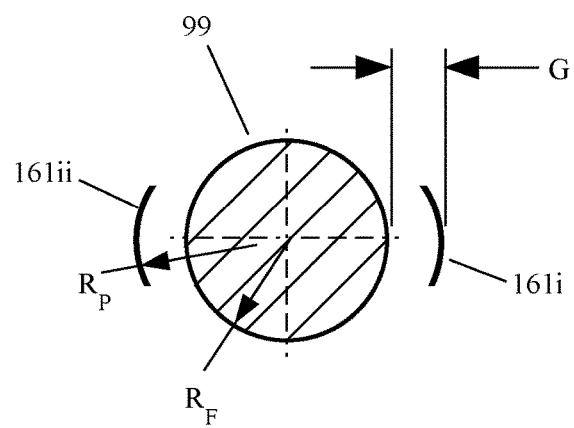
FIG. 7C is an enlarged cross-sectional view through the multi-pronged tip of FIG. 7A.

FIG. 6 shows the opening formed around the coronal end of the file fragment 99 after the umbrella drill has been removed. Next, as seen in FIG. 7 and FIG. 7A, a tool 160 may be inserted into the root canal and may be used for welding of its multi-pronged tip to the file fragment 99 in the root canal, using electric current supplied to the prongs of the tip, which may be made of tin. Other suitable metals may be used in other embodiments. In one embodiment the tool may be 1.1 millimeters in diameter, and in other embodiments, another size may be used as required. Two prongs positioned 180 degrees apart may be used on the tool 160, as shown in FIG. 7A. In other embodiments, three prongs, or four prongs (see e.g., FIG. 8A), or other numbers of prongs may alternatively be used, and which may be equally spaced about an axis of the shaft at the distal end (see FIG. 7A). The prongs may each be formed with curvature (e.g., compound curvature) that may match the curved shape of the particular file fragment that had become lodged in the canal. For example, the file fragment may have had a 2% taper, or a 3% taper, etc., having a varying radius of curvature along the length of the fragment/prong, e.g., a 0.2 mm diameter at the end of the fragment having a 2% taper that tapers to a 0.26 mm diameter along a length of 3 mm. As seen in FIG. 7C, the radius of curvature $R_P$ of the prongs may roughly match the radius of curvature of the fragment RF at each position along the length of the prong. (i.e., the practitioner may know the diameter of the file where the fragment broke off, and may choose a device having prongs with comparable dimensions in terms of diameter and taper). A set of such tools may be provided for each taper (2%, 3%, etc.), where each tool may have prongs that accommodate different portions of the file that may be wedges as a fragment within the root canal. The prongs may each also be formed to have a desired amount of flexibility. In one embodiment, a prong that may have a length between 1 mm and 2 mm may be able to flex/deform up to 60 degrees, and may be able to do so several times without failure and loss of strength that would not permit the tool to perform the extraction of the file fragment. Once the welded prongs of the tool have cooled sufficiently, which cooling may be accelerated through irrigation, the tool may be rotated using a reverse twist, and may be withdrawn to facilitate extraction of the file fragment 99.

In a second embodiment of the present invention for removing a file fragment 99 from a root canal, the pilot hole drill 120 and the umbrella drill 140 may be used as noted above to form an opening in the canal around the coronal end of the file fragment 99. Then, as shown in FIG. 7, a tool 180 with a multi-pronged tip may be inserted into the root canal such that the prongs may surround the exposed end of the file fragment. As with the other embodiment, each of the prongs may be formed with curvature that may correspond to the curved shape of the particular file fragment that had become lodged in the canal. In one embodiment the curvature of the inside surface of the prongs may match the curvature of the exposed portion of the file fragment very closely (i.e., have the same radius and/or taper), and may also be formed to be offset using a gap C from the envelope of the tile fragment (see FIG. 7C). In another embodiment, the curvature of the inside surface of the prongs may be formed to be slightly larger (i.e., have a slightly larger radius and/or taper) to permit ease of nesting of the end of the file fragment within the prongs. In another embodiment, rather than have the inside surface of the prongs formed to be somewhat parallel to the outside surface of the fragment, as seen for prongs 161*i* and 161II in FIG. 7A, prongs 162*i*/162*ii* may be oriented at a slight angle to better facilitate nesting of the end of the trapped file fragment between the prongs, as shown in FIG. 7B.

Figures 8, 8A:
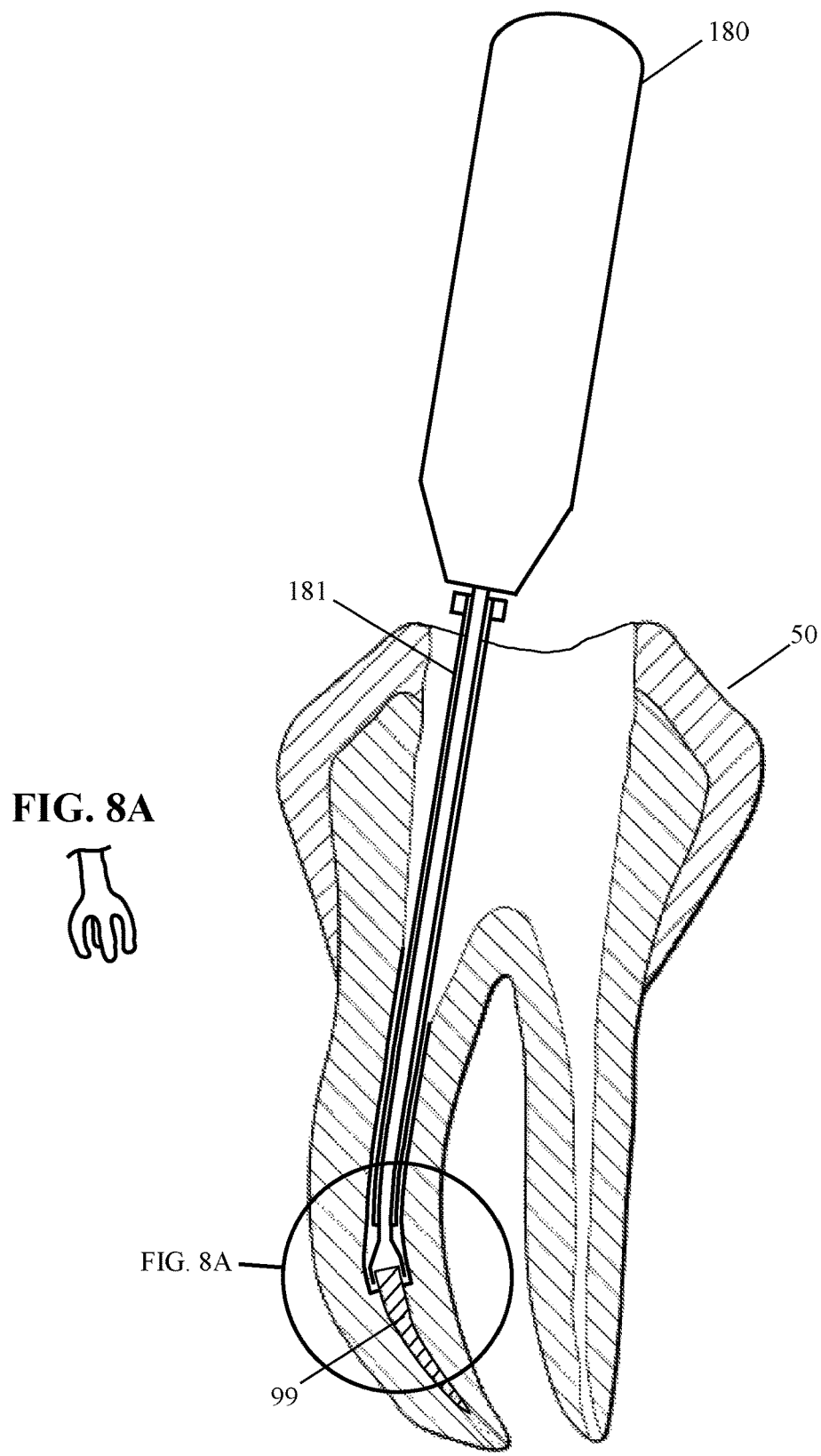
FIG. 8 illustrates insertion of a tool with a multi-pronged tip that surrounds the exposed end of the file fragment in the root canal, and which is to be welded thereto using ultrasonic vibrations.
FIG. 8A is an enlarged detail view of another embodiment of a multi-pronged tip that may be formed on the distal end of the shaft of the tool of FIG. 8.
Figure 9:
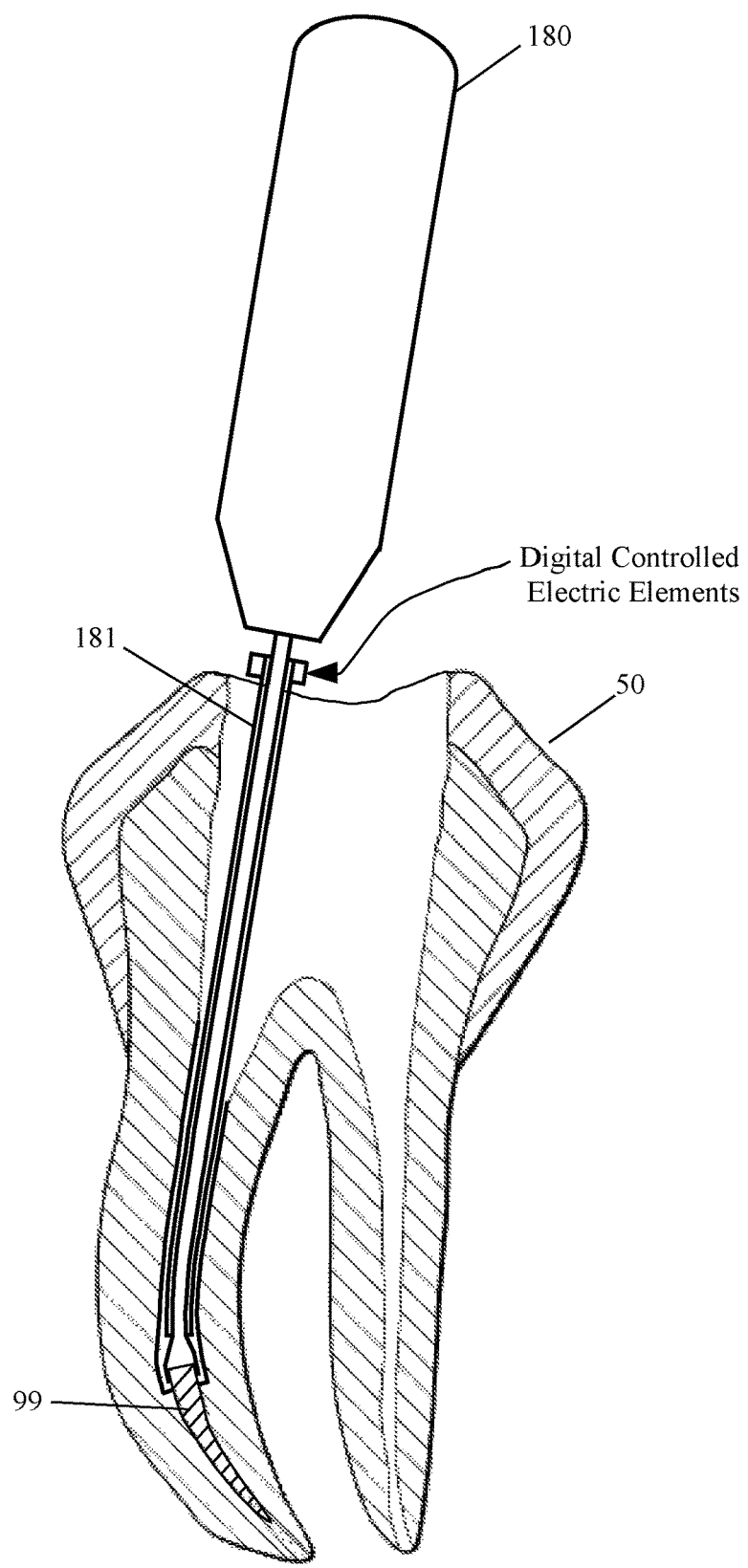
FIG. 9 illustrates the tool of FIG. 8, showing the concentric shaft member having been slid down to wedge the prongs of the tip into contact with the exposed end of the file fragment, which may also deliver vibrations supplied by piezoelectric elements, to weld the tip prongs to the file fragment.
Figure 10:
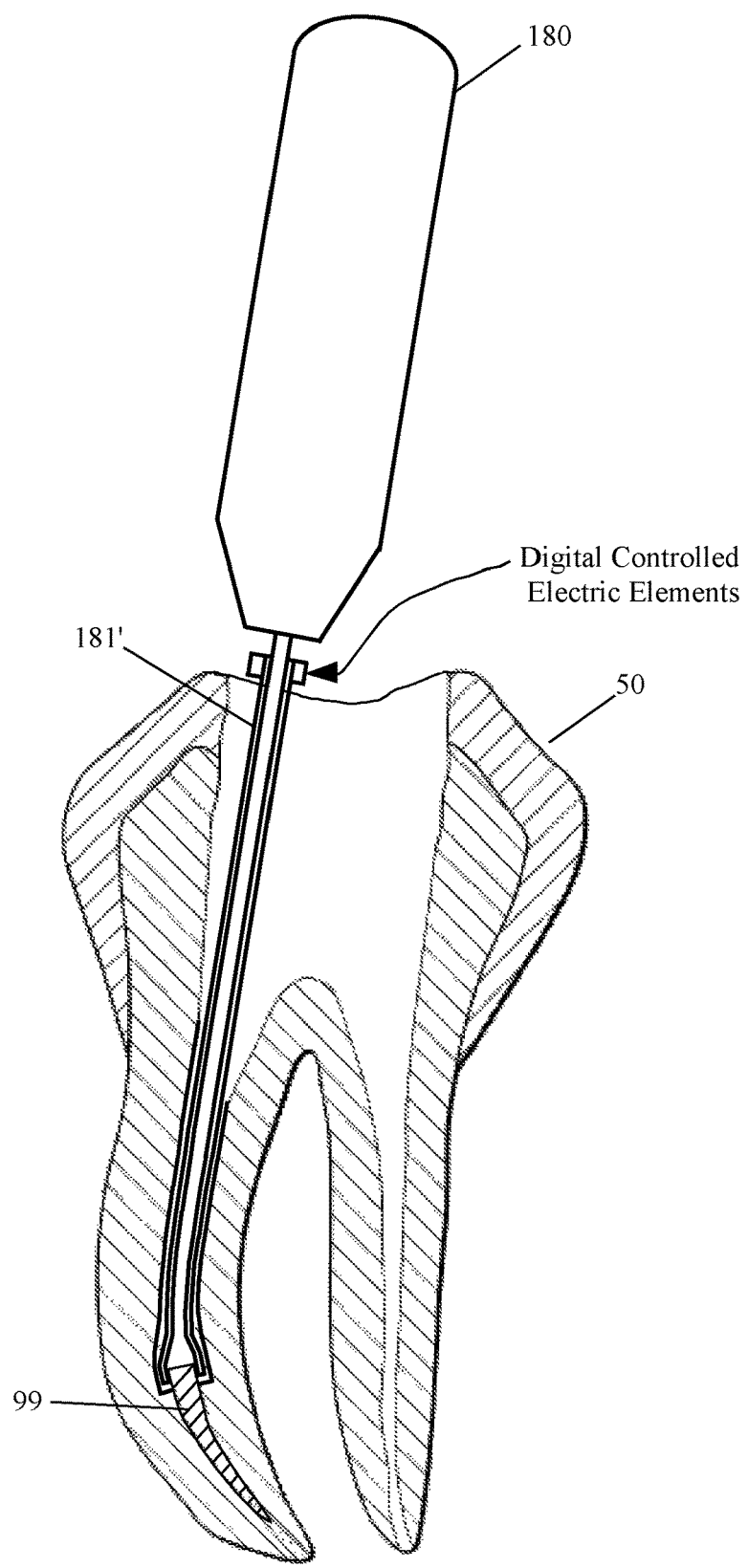
FIG. 10 illustrates the tool of FIG. 9, but where the tool has been slid down sufficiently to overlie the prongs to cause more uniform deformation and better contact of the prongs with the file fragment.

Next, as shown in FIG. 8, a concentric shaft member 181 on the tool 180 may be slid down to cause deformation of the prongs so that a substantial portion thereof (e.g., at least 25% in one embodiment, at least 50% in another embodiment, and at least 75% in yet another embodiment) may contact the exposed end of the metallic file fragment 99. In one embodiment, as shown in FIG. 9, the distal end of the concentric shaft member 181 may approach but not overlie the prongs, and may nonetheless cause them to move/deform into contact with the fragment. In another embodiment, as shown in FIG. 10, a portion of the concentric shaft member 181' may be configured to overlay and be concentric with the prongs as well, and the distal end portion of the concentric shaft member 181 may be constructed to elastically deform in order to overlie the prongs (e.g., the distal end may be formed of a highly elastic material, or may be formed of a mesh).

Either shaft may include, or may be coupled to, piezo electric elements that may cause the distal end of the shaft to deliver ultrasonic vibrations to the prongs. The vibrations transmitted between the prongs and the metallic file fragment 99 may generate heat locally, therebetween, which melts and welds the prongs to the file fragment. After cooling of the welded prongs, which cooling can be augmented using flow of an irrigant through a lumen in the tool, a torque may be applied to the tool 180 to facilitate rotation of the wedged tile fragment 99 to cause its extraction from the root canal. A reverse twist may be used for the rotation.

In another embodiment, after welding and cooling of the prongs, the piezo electric elements may again be used, possibly at a lower setting/frequency, so that the reduced vibrations may assist in overcoming the static friction while trying to initially rotate the wedged file fragment 99 within the canal. A reverse twisting motion may then be used for withdrawing of the wedged file fragment 99, being reverse with respect to the rotation that was used for the filing process for cleaning and shaping of the canal (i.e., where the file is twisted in a clockwise manner for filing to accomplish the cleaning and shaping, reverse twisting for removal would be in a counter-clockwise direction).

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A device for removing a file fragment lodged within a root canal of a tooth, said device comprising:
   a flexible shaft having a proximal end and a distal end, at least said distal end of said flexible shaft configured to be inserted into the root canal of the tooth;
   a plurality of prongs configured to extend from said distal end of said flexible shaft;
   a concentric shaft configured to slide upon said flexible shaft and move said plurality of prongs into contact with the file fragment;
   means for delivering vibrations at an intensity configured to cause local melting of the plurality of prongs in contact with the file fragment, and welding of each of the plurality prongs to the file fragment.

2. The device according to claim 1 wherein an interior surface of each of said plurality of prongs comprises curvature configured to match a curvature of a proximal portion of the file fragment.

3. The device according to claim 2 wherein said interior surface of each of said plurality of prongs is spaced apart from the file fragment.

4. The device according to claim 1 further comprising a lumen formed in said flexible shaft to accommodate flow of an irrigant therein.

5. The device according to claim 1 wherein each of said plurality of prongs is formed at an angle to an axis of said flexible shaft at said distal end.

6. The device according to claim 5 wherein said plurality of prongs are equally spaced about the axis of said flexible shaft at said distal end.

7. The device according to claim 6 wherein said plurality of prongs comprises two prongs positioned 180 degrees apart.

8. The device according to claim 6 wherein said plurality of prongs comprises three prongs positioned 120 degrees apart.

9. A method of extracting a metal fragment wedged in a root canal of a tooth comprising the steps of:

enlarging the root canal in which the metal fragment is wedged using a drill;

forming an opening in the canal around the coronal end of the wedged metal fragment using an umbrella drill to expose a portion of the proximal end of the metal fragment;

inserting a tool with a multi-pronged tip into the root canal so the prongs surround the exposed end of the metal fragment;

sliding a member concentric with a shaft of the tool toward the prongs for causing a substantial portion of each of the prongs to be in contact with the metal fragment;

delivering ultrasonic vibrations to the prongs sufficient for generating heat locally for melting and welding of the prongs to the metal fragment;

cooling of the prongs;

applying a torque to the tool to cause rotating of the wedged metal fragment to cause dislodgment of the metal fragment; and extracting of the tool and metal fragment from the root canal.

10. The method according to claim 9, further comprising augmenting said cooling by flowing an irrigant through a lumen in the tool.

11. The method according to claim 9, further comprising delivering ultrasonic vibrations to the prongs, after said cooling, being insufficient in intensity to cause local melting of the prongs, but having sufficient intensity for overcoming static friction during said applying of a torque for easier rotating of the tool and the wedged metal fragment within the canal.

12. The method according to claim 9, further comprising applying said torque to cause said rotating of the tool to be reversed from a rotating of the file used for cleaning and shaping.

\* \* \* \* \*